United States Patent [19]

Iwase et al.

[11] 4,169,438

[45] Oct. 2, 1979

[54] ELECTRONIC IGNITION TIMING CONTROL SYSTEM FOR INTERNAL COMBUSTION ENGINE

[75] Inventors: Kazuo Iwase; Ritsu Katsuoka, both of Okazaki, Japan

[73] Assignee: Nippon Soken, Inc., Nishio, Japan

[21] Appl. No.: 842,885

[22] Filed: Oct. 17, 1977

[30] Foreign Application Priority Data

Nov. 6, 1976 [JP] Japan .................. 51-133321

[51] Int. Cl.$^2$ ............................ F02P 5/08; F02P 5/04
[52] U.S. Cl. ........................... 123/117 D; 123/117 R
[58] Field of Search ............ 123/117 D, 148 E, 117 R

[56] References Cited

U.S. PATENT DOCUMENTS

| | | | |
|---|---|---|---|
| 3,888,220 | 6/1975 | Bigalke | 123/148 E |
| 3,996,911 | 12/1976 | Canup | 123/117 D |
| 4,018,197 | 4/1977 | Salway | 123/117 D |
| 4,036,190 | 7/1977 | Bigliani | 123/117 D |
| 4,052,967 | 10/1977 | Colling | 123/117 D |
| 4,068,631 | 1/1978 | Lombard | 123/117 D |
| 4,081,995 | 4/1978 | Griffith | 123/117 D |
| 4,086,895 | 5/1978 | Habert | 123/117 D |

*Primary Examiner*—Jay P. Lucas
*Attorney, Agent, or Firm*—Cushman, Darby & Cushman

[57] ABSTRACT

Ignition timing control for an internal combustion engine is achieved by sensing engine rotation so as to generate output pulses for predetermined degrees of rotation and to develop a reset pulse at a rotational reference position. A first digital signal representing rotational speed of the engine and a second digital signal representing engine intake vacuum are converted into output date representative of optimum retard angles from the reference position. The output date are added to generate a plural bit binary signal having higher and lower significant bits. Comparison means, responsive to the reset pulse, counts the output pulses representing degrees of engine rotation and generates an output signal when the count reaches the value of the higher significant bits. Additional comparison means, responsive to the output signal from the first mentioned comparison means, counts multiplied output pulses representing degrees of engine rotation and generates an output signal representing optimum ignition time when the count reaches the value of the lower significant bits.

3 Claims, 7 Drawing Figures

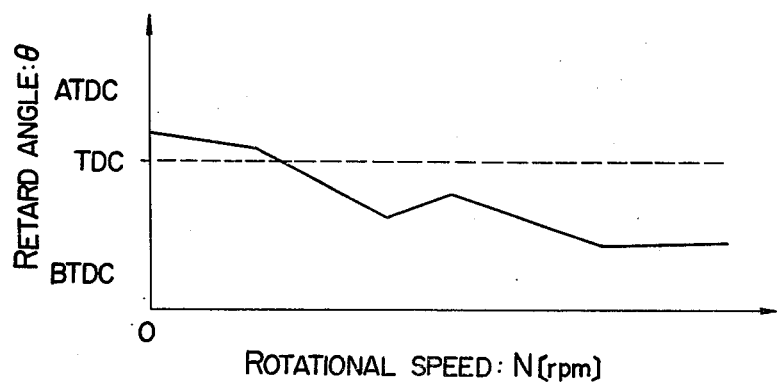
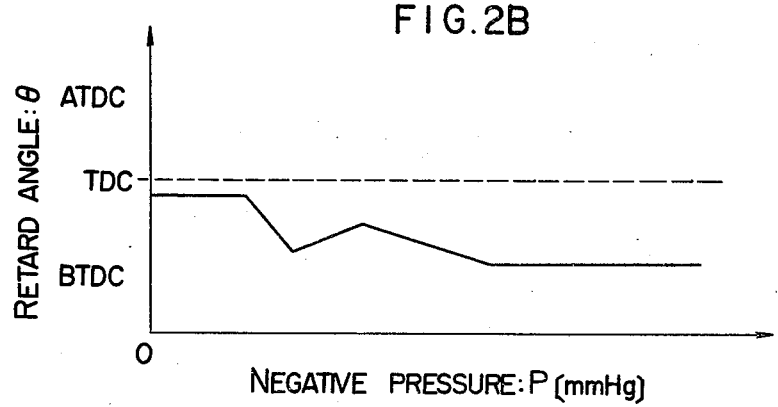

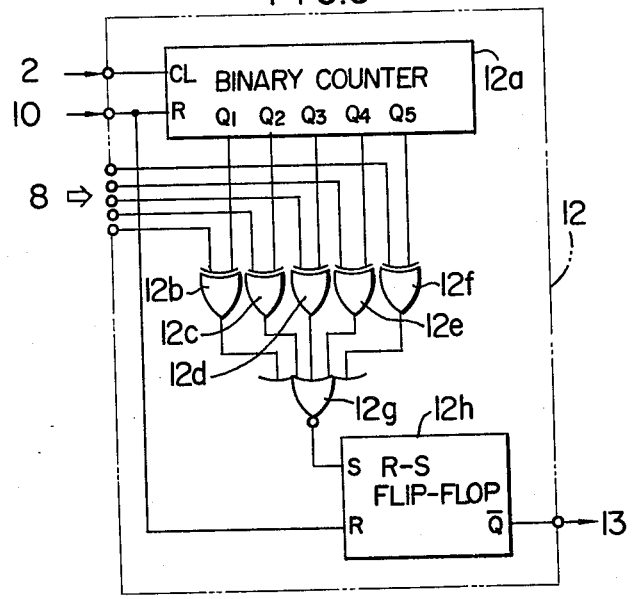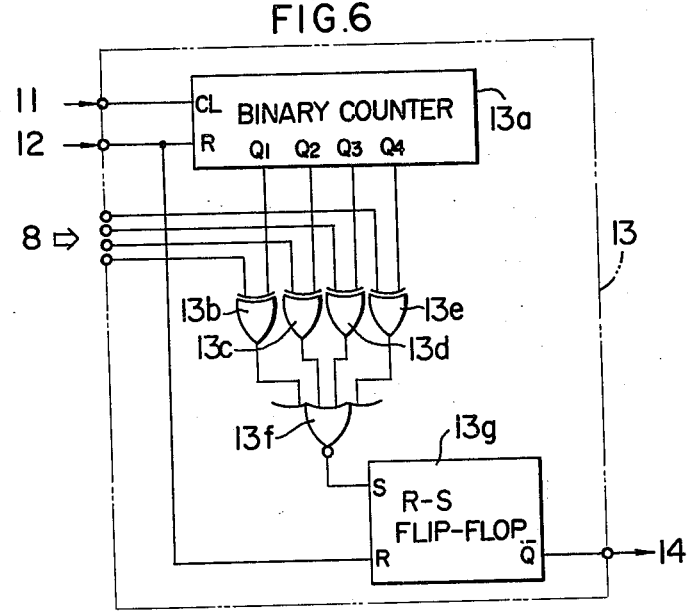

ELECTRONIC IGNITION TIMING CONTROL SYSTEM FOR INTERNAL COMBUSTION ENGINE

BACKGROUND OF THE INVENTION

1. Field of the Invention

The present invention relates to an electronic ignition timing control system for electrically determining the ignition timing of an internal combustion engine.

2. Description of the Prior Art

In the past, conventionally used distributors for determining the ignition timing of internal combustion engines have been so designed that the relative positions of the cam and the elements in the electric contact unit employing points are changed in accordance with the engine rotational speed and the intake manifold vacuum respectively detected by the centrifugal governor and the vacuum advancer, and an ignition signal is generated at the correct ignition point that suits the operating conditions of the engine.

However, since the above-mentioned conventional systems are all controlled mechanically, the systems are disadvantageous in that the ignition timing tends to be inaccurate and it is difficult to ensure the ideal ignition timing characteristic, thus making the systems unsuitable from the standpoint of exhaust emission control which has presently become an issue.

Although electronic ignition systems have also been proposed in which the ignition timing is electronically determined by dividing the initially set ignition advance angle by the engine speed and converting it into time, a disadvantage of this type of conversion systems is that since the number of engine revolutions must be computed thus requiring the time for computing it, the value of the engine speed represents the average number of the engine revolutions within the computing time, and consequently any variation in the engine revolutions during the computing time causes an error. Further, though a system has been proposed in which in consideration of the above-mentioned difficulty a rotor disk is formed along its circumference with slits each corresponding to a predetermined crank angle and the slits are detected to determine the ignition timing, this system is not suited for use in practical application in consideration of the manufacturing capacity and the capacity and durability of sensors for detecting the slits, since in practice the rotor disk must be formed with 180 slits in case the slits are provided at intervals of 2° of crank angle and the rotor disk is mounted on the crankshaft.

SUMMARY OF THE INVENTION

With a view of overcoming the foregoing deficiencies, it is an object of the present invention to provide a digital-type electronic ignition timing control system for an internal combustion engine wherein a retard angle from a predetermined rotational reference position of an internal combustion engine before the top dead center, for example, is read out from a predetermined program in accordance with the engine speed and the manifold vacuum, and this retard angle is compared by means of the signals from rotational angle detecting means adapted to generate a pulse for every 8° of crank travel, for example, and the signals from a multiplier circuit adapted to generate 16 pulses between the output pulses of the rotational angle detecting means to thereby determine the ignition timing, thus simplifying the manufacture of rotational angle detecting means, eliminating the danger of change in characteristics with time, making it possible to ensure the ignition timing of extremely improved accuracy, making it possible to easily change the ignition timing characteristic by changing the program, eliminating the need for any complicate computing circuit, and practically eliminating the computing time by virtue of the system being of the digital type or the system being of the fast response type.

It is another object of the present invention to provide such ignition timing control system in which the construction of the multiplier circuit is modified, thus making it possible to use counters of a small counting capacity for the multiplier circuit.

BRIEF DESCRIPTION OF THE DRAWINGS

FIGS. 2A and 2B are retard angle characteristic diagrams showing the programs stored in read-only memories used in the system shown in FIG. 1.

FIGS. 5 and 6 are block diagrams showing the construction of the first and second comparators used in the system shown in FIG. 1.

DESCRIPTION OF THE PREFERRED EMBODIMENT

Figure 1:
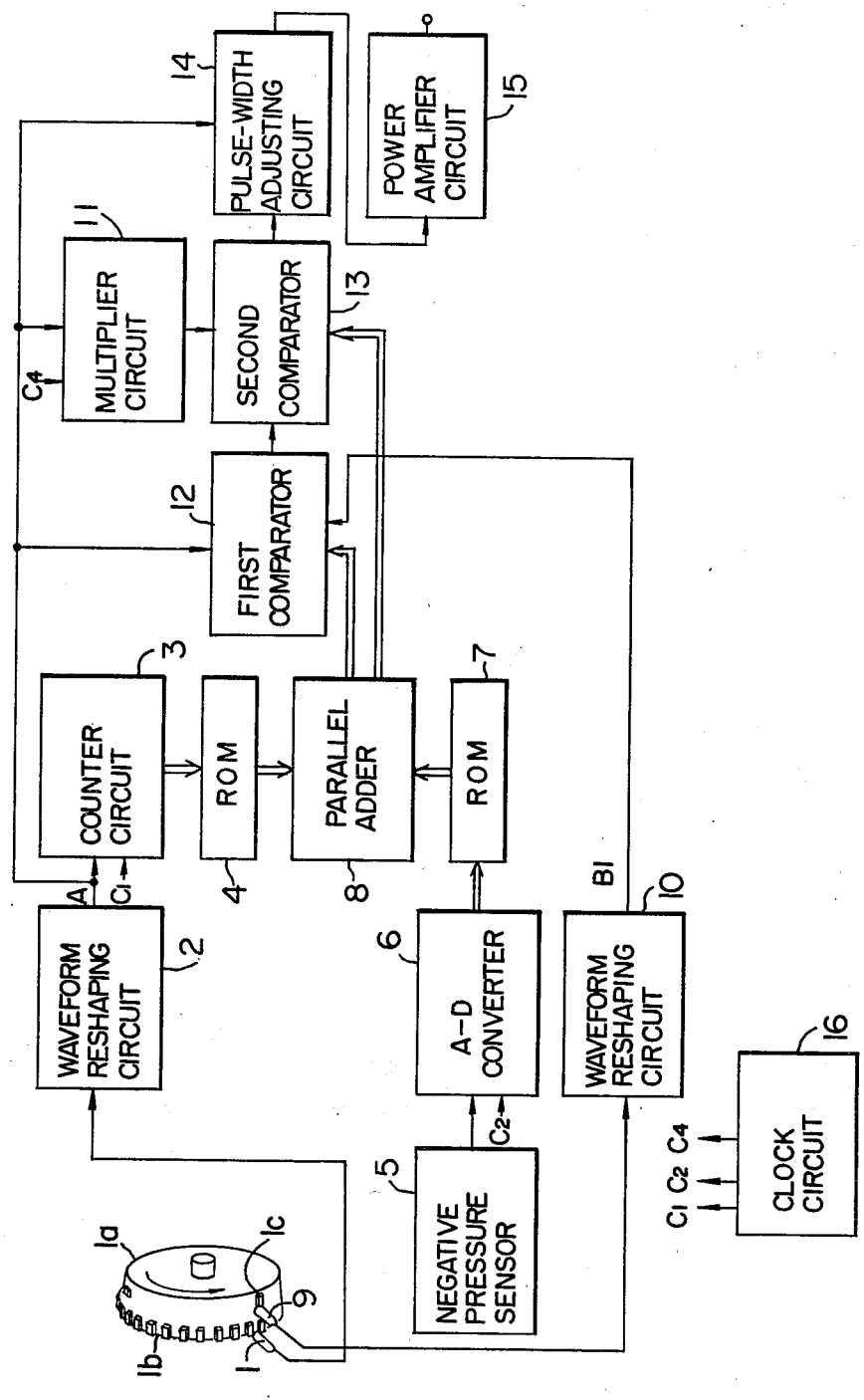
FIG. 1 is a block diagram showing the general construction of an embodiment of a system in accordance with the present invention.

The present invention will now be described with reference to the illustrated embodiment. In FIG. 1 illustrating a block diagram showing the general construction of an embodiment of the system in accordance with the invention, numeral 1a designates a magnetic rotor disk coupled to the shaft (e.g., the engine camshaft) which is driven at one-half the speed of a four cylinder, four cycle internal combustion engine and provided with equispaced teeth 1b dividing the entire disk circumference into 90 equal parts and teeth 1c dividing the entire circumference into 4 equal parts, 1 an electromagnetic pickup for detecting the teeth 1b dividing the rotor disk 1a into 45 equal parts. The detection signal of the electromagnetic pickup 1 has a frequency of 450 Hz when the engine speed is at 600 r.p.m. Numeral 2 designates a waveform reshaping circuit for amplifying and changing the output signal of the electromagnetic pickup 1 into a rectangular waveform. A suitable conventional reshaping circuit which may be employed is Fairchild Semiconductor's μA 3302. Numeral 3 designates a conventional counter circuit responsive to the output signals of the waveform reshaping circuit 2 for detecting the engine speed by counting the clock pulses $C_1$ from a clock circuit 16. A suitable clock circuit arrangement is a crystal oscillator as described in the RCA Solid State Data book, 1973, and RCA's CD 4040. Numeral 4 designates a known type of read-only memory (hereinafter referred to as an ROM) adapted to receive the output of the counter circuit 3 as an input address and preliminarily programmed to store for example the retard angle characteristic $\theta$ from a rotational reference angular position due to the engine rotational speed N as shown in FIG. 2A, and it generates an output in binary code form. Numeral 5 designates a semiconductor negative pressure sensor which is mounted in the engine intake manifold to detect the negative pressure in the intake manifold and generate an analog voltage. Numeral 6 designates a conventional A-D converter wherein the output voltage of the negative pressure sensor 5 is converted into a digital signal in response to the clock pulses $C_2$ from the clock circuit 16. The A-D converter 6 includes a memory circuit and generates an output in binary code form. Numeral 7 designates an ROM adapted to receive the output of the A-D converter 6 as an input address and preliminarily programmed to store for example the retard angle characteristic $\theta$ from the rotational reference angular position due to the negative pressure P as shown in FIG. 2B. Numeral 8 designates a parallel adder (such as RCA's CD 4008) for parallely adding the binary code outputs of the ROMs 4 and 7 to generate a 9-bit binary code output. Numeral 9 designates an electromagnetic pickup for detecting the position of the teeth 1c or the rotational reference angular position to generate four pulses for every one revolution of the rotor disk 1a. Numeral 10 designates a waveform reshaping circuit which is similar to circuit construction with the waveform reshaping circuit 2. Numeral 11 designates a multiplier circuit for multiplying the output frequency of the waveform reshaping circuit 2 by a factor of 16. Numerals 12 and 13 designate first and second comparators, and the first comparator 12 is adapted to be reset by the output of the waveform reshaping circuit 10 to start comparison operation so that when the number of the output pulses of the waveform reshaping circuit 2 becomes equal to a data from the adder 8, an output signal is generated to reset the second comparator 13. When this occurs, the second comparator 13 starts comparison operation and it generates an output signal when the number of the output pulses of the multiplier circuit 11 becomes equal to a data from the adder 8. In this embodiment, of the 9-bit output of the adder 8, the higher five bits are applied to the inputs of the first comparator 12 and the lower four bits are applied to the inputs of the second comparator 13. And the multiplication factor of the multiplier circuit 11 is selected $2^4=16$ corresponding to the numerical value of the lower four bits. Also the counter circuit 3, the ROM 4, the negative pressure sensor 5, the A-D converter 6, the ROM 7 and the adder 8 constitute an ignition timing setting circuit responsive to the parameters of the engine for generating, in accordance with the predetermined programs, a binary code output of $(m+n)$ bits (in this embodiment, $m=5$ and $n=4$ and thus $m+n=9$ bits) which represents the desired ignition angle in terms of a retard angle from the rotational reference angular position. In FIG. 2, reference symbols TDC, BTDC and ATDC on the ordinate respectively indicate the top dead center position and positions before and after the top dead center, and ZERO on the abscissa indicates the rotational reference angular position at which each tooth 1c is opposite to the pickup 9.

Although not shown in detail, the counter circuit 3 comprises a NAND gate adapted to be opened by the output signals of the waveform reshaping circuit 2 to pass the clock pulses $C_1$ from the clock circuit 16, a counter for counting the clock pulses passed through the NAND gate, a latch circuit (temporary memory circuit) for temporarily storing the count value of the counter and generating an output binary code to determine an address of the ROM 4, and a signal generator responsive to the output signals of the waveform reshaping circuit 2 to generate a reset signal for the counter and a memory command signal for the latch circuit. Also, in order to determine an address of the ROM 7, the A-D converter 6 comprises, although not shown, a counter for counting the clock pulses $C_2$ from the clock circuit 16 which will be described later, a latch circuit (temporary memory circuit), a signal generator for generating at a predetermined period reset signals for the counter and a comparator, whereby the analog output of the negative pressure sensor 5 corresponding to the negative pressure is compared with the staircase wave output corresponding to the output of the counter, and when equality is found between the two outputs so that the comparator generates an output, namely, when the output of the counter attains a value corresponding to the detected negative pressure, the output of the comparator is applied as a memory command signal to the latch circuit which in turn stores the then current output of the counter and the resulting output binary code of the latch circuit determines an address of the ROM 7. Numeral 14 designates a known type of pulse width adjusting circuit (such as RCA's CD 4017 and CD 4013) which is a circuit adapted to adjust the pulse signal from the second comparator 13 and comprising a decoder 1 counter and an R-S flip-flop, whereby an adjustment of 8° (the crank angle per angle signal pulse) × 9 (the number of pulses) or 72° of crank angle is provided in response to the output signal of the second comparator 13 and the angle signals from the waveform reshaping circuit 2. Numeral 15 designates a known type of power amplifier circuit whereby the signal from the pulse width adjusting circuit 14 is subjected to power amplification to actuate an igniter. Numeral 16 designates the clock circuit for generating the clock pulses $C_1$, $C_2$ and $C_4$.

Figure 3:
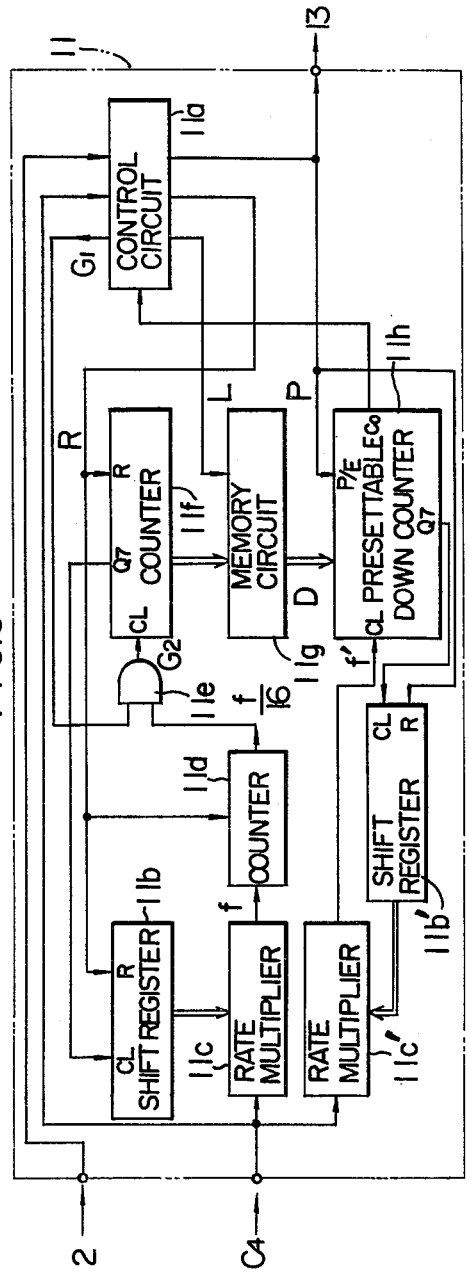
FIG. 3 is a block diagram showing the construction of the multiplier circuit used in the system shown in FIG. 1.
Figure 4:
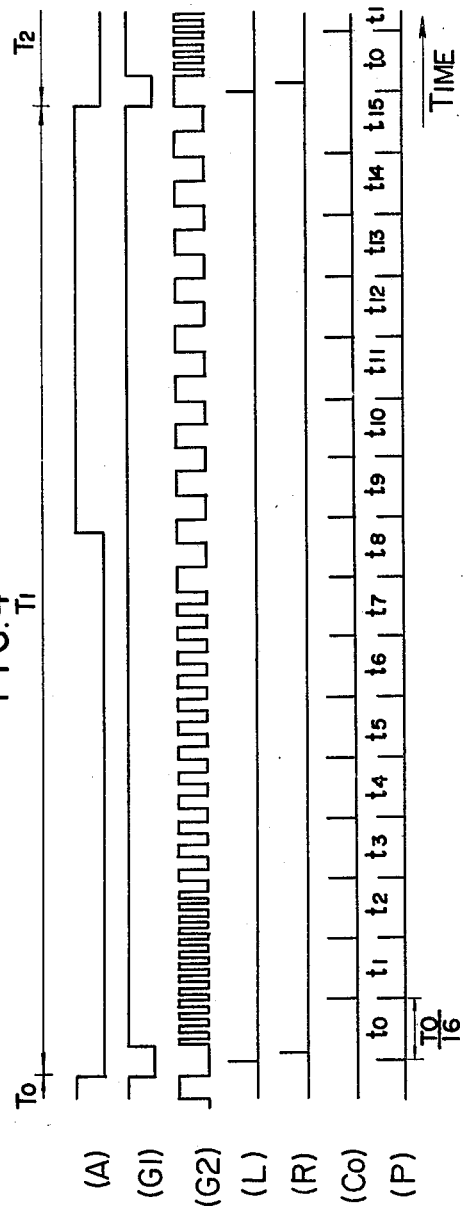
FIG. 4 is a waveform diagram useful for explaining the operation of the multiplier circuit shown in FIG. 3.

Next, the principal constituent elements of the invention, i.e., the multiplier circuit 11 and the first and second comparators 12 and 13 will be described in greater detail. The circuit construction of the multiplier circuit 11 is shown in FIG. 3, and FIG. 4 shows the waveforms generated at various points in FIG. 3. In FIG. 3, numeral 11a designates a control circuit responsive to the clock pulses $C_4$ from the clock circuit 16 and the signals from the waveform reshaping circuit 2 to generate control signals for controlling the associated circuits and comprising a decoder/counter such as RCA's CD 4017, a D-type flip-flop (such as RCA's CD 4013) and a plurality of gates (formed, for example, by interconnecting inverter circuits, such as RCA's CD 4001, in conventional fashion) for generating the signals shown in ($G_1$), (L), (R) and (P) of FIG. 4. Numerals 11b and 11b' designate serial-in, parallel-out type shift registers (such as RCA's CD 4015) adapted to be respectively reset by the signals R and P from the control circuit 11a and respectively receive as an input clock the $Q_7$ output of a counter 11f (such as RCA's CD 4040) and the $Q_7$ output of a presettable down counter 11h (such as RCA's CD 4029) whereby each of the shift registers shifts up by one place each time the input clock goes from "0" to "1". Numerals 11c and 11c' designate rate multipliers (such as RCA's 4089) respectively responsive to the output signals of the shift registers 11b and 11b' for dividing the frequency of the clock signals $C_4$ from the clock circuit 16. More specifically, the $Q_7$ output of the counter 11f is applied as a clock pulse to the shift register 11b so that unless the $Q_7$ output of the counter 11f goes from "0" to "1," the outputs of the shift register 11b are all "0" and the clock signals $C_4$ are delivered as such as the output signals of the rate multipliers 11c.

When the $Q_7$ output of the counter 11f goes for the first time from "0" to "1," namely, when the counter 11f counts a predetermined number or $2^6$ of the signals $G_2$, the least significant position output goes to "1." When this occurs, the output signal of the rate multiplier 11c has a frequency equivalent to $\frac{1}{2}$ the frequency of the clock signals $C_4$. When the $Q_7$ output of the counter 11f goes from "0" to "1" for the second time, namely, when the counter 11f counts again the predetermined number or $2^6$ of the signal $G_2$, the next least significant position output goes to "1." Thus, the output signal frequency of the rate multiplier 11c becomes equal to $\frac{1}{4}$ the frequency of the clock signals $C_4$. Consequently, each time the control circuit 11a generates a signal R at intervals of the period T of the signals A from the reshaping circuit 2, the rate multiplier 11c repeats all over again the operation of increasing the frequency dividing factor for every predetermined number of pulses of the input clock signals $C_4$ and performing frequency division. On the other hand, the $Q_7$ output of a presettable down counter 11h is applied as a clock pulse to the shift register 11b' so that unless the $Q_7$ output of the counter 11h goes from "0" to "1," the outputs of the shift register 11b' are all "0" and the clock signals $C_4$ are delivered as such as the output signals of the rate multiplier 11c'. Then, when the $Q_7$ output of the counter 11h goes from "0" to "1" for the first time or when the counter 11h counts a predetermined number or $2^6$ of the clock pulses, the least significant position of the shift register 11b' goes to "1" and consequently the output signal frequency of the rate multiplier 11c' becomes equal to $\frac{1}{2}$ the frequency of the clock signals $C_4$. When the $Q_7$ output of the counter 11h goes from "0" to "1" for the second time, namely, when the counter 11h counts again the predetermined number or $2^6$ of the clock pulses, the next least significant position output of the shift register 11b' goes to "1" and consequently the output signal frequency of the rate multiplier 11c' becomes equal to $\frac{1}{4}$ the frequency of the clock signals $C_4$. As a result, each time a signal P is generated from the control circuit 11a, the rate multiplier 11c' repeatedly performs all over again the previously mentioned operation of increasing the frequency dividing factor for every predetermined number of the input clock pulses $C_4$ and performing frequency division, and the period of the output signals f' of the rate multiplier 11c' changes in analogously proportional relation with the change in the period of the output signals of a counter 11d of a type similar to counter 11f. The shift registers 11b and 11b' and the rate multiplier circuits 11c and 11c' constitute a variable frequency divider circuit. The counter 11d constitutes a frequency divider which is adapted to be reset by the signal R from the control circuit 11a for generating a frequency divided by a factor of 16. Numeral 11e designates an AND gate for performing the AND operation on the signal $G_1$ from the control circuit 11a and the output signals of the counter 11d to pass the clock pulses shown in ($G_2$) of FIG. 4 to the counter 11f constituting a counter circuit, and the counter 11f is reset by the signal R from the control circuit 11a. Numeral 11g designates a memory circuit responsive to the signal L shown in (L) of FIG. 4 for storing the binary code output of the counter 11f. A circuit suitable for this purpose is RCA's CD 4035. The presettable down counter 11h constitutes a coincidence detection circuit and is presettable to the data (D) of the memory circuit 11g in response to the application to its preset input P/E of the signal shown in (P) of FIG. 4. In response to the output signals f' of the rate multiplier 11c' which change in analogous proportion to the period of the output signals of the counter 11d, the presettable down counter 11h counts down and generates a signal at its carry-out terminal $C_o$ when its count value is reduced to 0. In response to the generation of this signal, the control circuit 11a generates and applies a preset signal P to the presettable down counter 11h. Consequently, the presettable down counter 11h is preset to the data D of the memory circuit 11g so that the presettable down counter 11h again down counts its content and a signal $C_o$ is generated at the carry-out terminal $C_o$ when the count value is reduced to 0. In this way, signals $C_o$ are successively generated. Consequently, the resulting preset signals P are in the form of output signals generated at equal spacing as shown in (P) of FIG. 4. What is to be noted here is the fact that since the clock frequency supplied to the counter 11f is approximately 1/16 the clock frequency f supplied to the counter 11d, since the clock frequency supplied to the down counter 11h is f' which is practically the same with the clock frequency f supplied to the counter 11d (although their periods change differently from each other) and since the input signals to the down counter 11h change in analogous proportion to the period of the output signals of the counter 11d, if $T_o$ time is required for the counter 11f to count the data D, the time required for the down counter 11h to be preset to the data D and count down its count value to 0 will be about $T_o/16$. As a result, 16 pulses of a period $T_o/16$ or 16 preset signals P will be generated during the time period $T_o$. It is to be noted here that if the time $T_o$ is equal to a time $T_1$ in the case of the output pulses of the waveform reshaping circuit 2 or the waveform shown in (A) of FIG. 4, the periods $t_o$ to $t_{15}$ will be the same with one another, whereas if the engine speed changes rapidly thus inevitably causing the time periods $T_o$ and $T_1$ to differ from each other, assuming that $T_o > T_1$, for example, then the pulse periods $t_o$ to $t_{14}$ will be the same with one another but the period $t_{15}$ will not appear when $T_o - T_1 < T_o/16 = t_o$, whereas a pulse of the period $t_{15}$ of $t_o > t_{15}$ will be generated when $T_o - T_1 > T_o/16 = t_o$. However, since each of $T_o$, $T_1$, $T_2$ is 8° in terms of crank angle degrees and this 8° is divided by 16, each of $t_o$ to $t_{15}$ corresponds to 0.5°. The experiments conducted show that if the accelerator pedal is rapidly depressed so that the crankshaft speed is changed from the idle to the full throttle, this change is such that the period $t_{15}$ will be barely lost and the change is no more than 0.5°. Moreover, since the frequency of the input clocks counted by the counter 11f is gradually decreased, as compared to the case where the input clocks of the same frequency is always counted, it is possible to reduce the counting capacity of the counter 11f as well as the storage capacity and counting capacity of the memory circuit 11g and the presettable down counter 11h.

Referring now to FIG. 5, the first comparator 12 comprises a binary counter 12a, EXCLUSIVE OR gates 12b, 12c, 12d, 12e and 12f, a NOR gate 12g and an R-S flip-flop 12h. After the binary counter 12a and the R-S flip-flop 12h have been reset by the output signal of the waveform reshaping circuit 10, the binary counter 12a starts counting the angle signals from the reshaping circuit 2. The period of these angle signals corresponds to 8° in terms of crank angle degrees. When the count value of the counter 12a becomes equal to the higher 5-bit binary code output of the adder 8, the R-S flip-flop 12h is set. Since the input clocks to the first comparator 12 are provided by the output of the waveform reshaping circuit 2 and they represent a crank angle itself, any change in the crankshaft speed during the counting operation may be reflected as such by the input clocks. Now referring to FIG. 6, the second comparator 13 comprises a binary counter 13a, EXCLUSIVE OR gates 13b, 13c, 13d and 13e, a NOR gate 13f and an R-S flip-flop 13g. When the $\overline{Q}$ output signal of the first comparator 12 goes from "1" to "0," the resetting of the binary counter 13a and the R-S flip-flop 13g is released so that the binary counter 13a starts counting by receiving the output signals of the multiplier circuit 11 as input clocks, and when the count value of the binary counter 13a becomes equal to the binary code output representing the lower 4 bits of the output of the adder 8 the R-S flip-flop 13g is set and its $\overline{Q}$ output goes from "1" to "0." What is important here is the fact that the transition point of the $\overline{Q}$ output from "1" to "0" represents the desired ignition point and it also corresponds with the total advance angle value of the adder 8. In this case, each input clock to the second comparator 13 which is the output signal of the multiplier circuit 11, corresponds to $8° \div 16 = 0.5°$ in terms of crank angle degrees. As a result, the same function is obtained as a detector consisting of a rotor disk having $45 \times 16 = 720$ teeth.

The principal advantages of the embodiment of the circuitry of the invention are as follows.

(1) Stable operation is ensured against variation of external conditions, e.g., power supply voltage, ambient temperature, ect., owing to all the control signals consisting of digital signals.

(2) Reduction in cost and standardization of assembly operations are made possible by integrated circuit technique owing to the entire circuitry being composed of digital operational elements.

(3) When the design characteristic is changed due to a change in the use application and type of engine, it is only necessary to change the programs of the ROMs 4 and 7 and in this way any desired characteristic can be easily preset.

(4) Since the total amount of ignition advance including the ignition advance provided in relation to the engine speed and the ignition advance provided in relation to the intake manifold vacuum (the amounts of ignition advance in relation to cooling water temperature, amount of exhaust gas, etc.) is compared with an output signal which is generated each time the engine rotates a predetermined angle, improved response, simplified circuit construction due to the absence of such complicated computing circuitry as used in desk calculators and higher accuracy are ensured.

(5) The system can be mounted on any presently available engine without modifying the engine proper but by simply mounting rotational angle detecting means and rotational reference position detecting means on the shaft (e.g., the crankshaft) which is driven at ½ the engine speed.

(6) The multiplier circuit may be composed of elements with small counting capacity and storage capacity.

While, in the embodiment described above, the first and second comparators 12 and 13 are provided by the counters 12a and 13a, the EXCLUSIVE OR gates 12 to 12f and 13b to 13e, the NOR gates 12g and 13f and the R-S flip-flops 12h and 13g, each of the first and second comparators 12 and 13 may be composed of a presettable down counter and an R-S flip-flop. Further, instead of using the presettable down counter 11h as a coincidence detection circuit, a coincidence detection circuit may be provided by a counter, EXCLUSIVE OR gates and a NOR gate.

Still further, while, in the above-described embodiment, the rotational angle detecting means and the rotational reference position detecting means are of the electromagnetic type comprising respectively the teeth 1b of the rotor disk 1a and the electromagnetic pickup 1, and the teeth 1c of the rotor disk 1a and the electromagnetic pickup 9, it is possible to use detecting means of photoelectric type comprising opposed two pairs of light emitting diodes and phototransistors and a light screen inserted between the two pairs of light emitting diodes and phototransistors and having slits formed at intervals of a predetermined rotational angle and reference rotational angle, respectively.

Still further, while, in the above-described embodiment, the engine speed and intake manifold vacuum are detected as the required engine parameters, other parameters such as cooling water temperature, amount of exhaust gas, etc., may be detected to control the amount of ignition advance.

What is claimed is:

1. In an ignition timing control system for an internal combustion engine:
    rotation detecting means, operatively coupled to said engine, for generating a rotation pulse each time said engine produces a rotation of a predetermined angle;
    reference position detecting means, operatively coupled to said engine, for generating a reference position signal each time said engine rotation reaches a rotational reference position;
    means for generating clock pulses of a fixed frequency;
    retard angle setting means connected to said rotation detecting means and said clock pulse generating means, for producing a digital signal representing an ignition retard angle from said rotational reference position, in accordance with operating conditions of said engine including engine rotational speed; and
    ignition time control means connected to said retard angle setting means, said rotation detecting means and said reference position detecting means, for counting, responsive to the reference position signal, the rotation pulses so as to produce an ignition timing signal when the counted value thereof reaches the digital signal produced in said retard angle setting means;
    the improvement comprising:
    frequency multiplying means connected to said clock pulse generating means, and connected between said rotation detecting means and said retard angle setting means, for multiplying the frequency of said rotation pulses by a constant multiplier value, said frequency multiplying means including: a first frequency divider for dividing the frequency of said clock pulses by a first divisor value; a second frequency divider connected to said first divider, for dividing the frequency of output pulses of said first divider by a second divisor value which is equal to said constant multiplier value; a first counter connected to said second frequency divider, for counting output pulses of said second frequency divider during a period of said rotation pulse and changing the first divisor value of said first frequency divider each time the number of the output pulses applied from said second frequency divider reaches a predetermined value; latch means connected to said first counter, for memorizing the count value of said first counter at the end of the period of said rotation pulse; a third frequency divider for dividing the frequency of said clock pulses by a third divisor value; and a second counter connected to said latch means and said third frequency divider, for counting output pulses of said third frequency divider and changing said third divisor value of said third frequency divider each time the number of the output pulses applied from said third frequency divider reaches a value equal to said predetermined value of said first counter, said second counter producing an output pulse to reset itself each time the count value thereof reaches the value memorized in said latch means.

2. An ignition timing control system according to claim 1, wherein said retard angle setting means includes:
- a first memory for memorizing ignition retard angles with respect to rotational speed of said engine and reading out one of said memorized ignition retard angles;
- a second memory for memorizing ignition retard angles with respect to vacuum pressure of said engine and reading out one of said memorized ignition retard angles; and
- a parallel adder, connected to said first and second memories, for totalizing the ignition retard angles read out from said first and second memories, thus setting the ignition retard angle in the binary code.

3. An ignition timing control system according to claim 2, wherein said ignition control means includes:
- a first comparator, connected to said rotation detecting means, said reference position detecting means and said parallel adder, for counting the number of said rotation pulses after the generation of said reference position signal and producing a first output signal when the count value of said rotation pulses reaches a value represented by some of the digits of said binary code, said some of digits being higher than the (n+1)th digit;
- a second comparator, connected to said frequency multiplying means, said first comparator and said parallel adder, for counting the number of said output pulses produced from said frequency multiplying means after the generation of said first output signal and producing a second output signal indicative of the ignition timing when the count value of said output pulses reaches a value represented by the other of the digits of said binary code, said other of the digits being those equal to and lower than the (n)th digit, and said constant multiplier value of said frequency multiplying means being equal to $2^n$.

* * * * *